United States Patent [19]
White

[11] Patent Number: 5,293,376
[45] Date of Patent: Mar. 8, 1994

[54] UPGRADED TELECOMMUNICATION NETWORK

[75] Inventor: Patrick E. White, Chester, N.J.

[73] Assignee: Bell Communications Research, Inc., Livingston, N.J.

[21] Appl. No.: 819,404

[22] Filed: Jan. 10, 1992

[51] Int. Cl.⁵ .............................................. H04J 3/12
[52] U.S. Cl. ......................................... 370/54; 370/55; 370/85.15; 379/207; 379/230
[58] Field of Search ................. 370/54, 55, 85.15; 379/210, 213, 207, 230

[56] References Cited

U.S. PATENT DOCUMENTS

| | | | |
|---|---|---|---|
| 4,754,479 | 6/1988 | Bicknell et al. | 379/207 |
| 5,095,480 | 3/1992 | Fenner | 379/220 |
| 5,136,583 | 8/1992 | Kondo | 370/85.15 |
| 5,179,548 | 1/1993 | Sandesara | 370/55 X |
| 5,185,736 | 2/1993 | Tyrrell et al. | 370/55 |

OTHER PUBLICATIONS

R. Ballart et al., "SONET: Now It's the Standard Optical Newwork." *IEEE Communications Magazine*, Mar. 1989, pp. 8–15.
H. Savit Say et al., "SONET: Optical Highway of the 1990's and Beyond," *Bellcore Exchange*, Jul./Aug. 1988, pp. 3–7.
J. E. Jakubson, "Managing SONET Networks," *IEEE LTS*, Nov. 1991, vol. 2, No. 4, pp. 5–13.
H. Shirakawa et al., "Japan's Network Evolution Relies on SDH-Based Systems," *IEEE LTS*, Nov. 1991, vol. 2, No. 4, pp. 14–18.
Michael To et al., "Planning and Deploying a SONET-based Metro Network, " *IEEE LTS*, Nov. 1991, vol. 2, No. 4, pp. 19–23.
T. R. Eames et al., "The Synchronous Optical Network and Fiber in the Loop," *IEEE LTS*, Nov. 1991, vol. 2, No. 4, pp. 24–29.
Izaz Haque et al., "Self-Healing Rings in a Synchronous Environment," *IEEE LTS*, Nov. 1991, vol. 2, No. 4. pp. 30–37.
P. Passeri et al., "Introducing SDH Systems in Europe," *IEEE LTS*, Nov. 1991, vol. 2, No. 4, pp. 38≧43.
Yau–Chau Ching et al., "Where is SONET", *IEEE LTS*, Nov. 1991, vol. 2, No. 4, pp. 44–51.
C. N. Day et al., "SONET and OSI: Making A Connection," *IEEE LTS*, Nov. 1991, vol. 2, No. 4, pp. 52–59.

*Primary Examiner*—Benedict V. Safourek
*Assistant Examiner*—Russell W. Blum
*Attorney, Agent, or Firm*—Leonard Charles Suchyta; James W. Falk

[57] ABSTRACT

The routing of signals in a telecommunication network 100' comprising a plurality of interconnected nodes 102, 103, 104, 104', 105, 106, 106' and 107, such as a SONET ring network, is modified through use of a controller 160. The controller 160 maintains a mapping between the telephone numbers of subscriber locations 132, 138, and the network nodes 104', 106' to Which the subscriber locations are attached The ring controller 160 permits a subscriber location to change the node to which it is attached without changing its telephone number. Utilizing the ring controller, new services such as ISDN, can be offered to a large body of potential subscribers while only a limited number of central offices are actually upgraded.

9 Claims, 5 Drawing Sheets

NOTE: B DENOTES AN 8-BIT BYTE

UPGRADED TELECOMMUNICATION NETWORK

FIELD OF THE INVENTION

The present invention relates to a telecommunication network. Specifically, the present invention relates to a telecommunication network comprising a plurality of interconnected nodes or central offices, such as a SONET ring network. A unique controller enables a subscriber location to change the central office or node in the network to which it is connected without changing the telephone number of the subscriber location. In other words, telephone number retention is achieved. The controller permits a network to be upgraded to deliver new communication services such as ISDN (Integrated Digital Services Network) or AIN (Advanced Intelligent Network) services in a highly efficient manner. In particular, the controller enables a network to be upgraded in a way so that new services can be offered to a large population of potential subscribers, while only a small number of central offices are actually upgraded.

BACKGROUND OF THE INVENTION

Most telephone networks in use today utilize hierarchical call routing. FIG. 1 illustrates a conventional hierarchical telephone network 10. The hierarchical network 10 comprises a plurality of nodes in the form of the central offices A, B, C, D, E, F, G, H, I. These central offices may be implemented by switches such as the #1A ESS. The central offices A, B, C, D, E, F, G, H, I are connected by the trunks 11. Individual units of customer premises equipment at individual subscriber locations are connected to particular central offices via a subscriber loop. For example, the customer premises equipment at the subscriber location 12 is connected via the subscriber loop 14 to the central office A. Similarly, the customer premises equipment at the subscriber location 16 is connected to the central office I via the subscriber loop 18.

Consider the case where the subscriber location 12 desires to place a call to the subscriber location 16. The best route through the network 10 is determined, e.g., a route through the central offices A, E, F, and I, and the call is completed.

In the United States, each subscriber location has a telephone number comprising an area code (three digits) a local exchange or NNX number (three digits) and a subscriber line number (four digits). Consider the case where the subscriber location 16 of FIG. 1 has the area code "abc", the NNX number "ghi" and the subscriber line number "uvxy". In a telephone network such as the network 10 of FIG. 1, the routing is hierarchical. A call originating at the subscriber location 12 and destined for the subscriber location 16 is transmitted to the local central office A via the subscriber loop 14. The central office A routes all calls it receives with the area code "abc" to the central office E so that the central office A is transparent to everything in a called telephone number that follows the area code "abc". Similarly, the central office E routes all calls with the area code "abc" to the central office F so that the central office E is also transparent to everything in a called telephone number which follows the area code "abc". The central office F routes all calls with an NNX number "ghi" to the central office I so that the central office F is transparent to the subscriber line number which follows the NNX number "ghi". Then, the central office I routes the call via the subscriber loop 18 which has the line number "uvxy" to the subscriber location 16. Because of this hierarchical routing, all of the telephone numbers with a particular NNX number (i.e., all of the telephone numbers of a particular local exchange) are connected to the same local central office. If telephones having the same NNX were connected to different central offices, a hierarchical routing scheme could not be utilized.

The hierarchical network 10 of FIG. 1 has a large number of central offices. In the past approximately fifteen years, transmission costs in telecommunication networks have been reduced by about three orders of magnitude. On the other hand, reductions in switching costs have been much more limited. Switching costs have been reduced by about a factor of four, i.e, less than one order of magnitude. In view of the large drop in transmission costs and the much more modest drop in switching costs, the efficiency of the conventional hierarchical telephone network is not optimal because a large number of central office switches is utilized to minimize the transmission distances for particular connections. Presently, in the United States there are about 10,000 central office switches and the number of lines on a switch is about 20,000.

In the conventional hierarchical network, telephone number retention is generally impractical. If a subscriber location with a specific NNX number in its telephone number were to be moved from the central office normally associated with the specific NNX number to a new central office, it would be necessary to update the routing tables of all central offices located within one hop of the original central office and within one hop of the new central office.

The lack of telephone number retention impacts the introduction of new services into the conventional hierarchical network. New services include for example digital voice, video and real time data transfer. Such services can be provided by upgrading a network to ISDN. In order to make ISDN available for all subscriber locations attached to a hierarchical network, it is necessary to upgrade simultaneously a large number of central offices to ISDN standards. If only a few of the central offices in the network are upgraded, only subscriber locations having local exchanges (i.e. having NNX numbers) belonging to the upgraded central offices will be able to take advantage of ISDN. Other subscriber locations with other NNX numbers will either have to change the central office to which they are connected and, therefore, also, change their telephone numbers, or else forego the use of the new telecommunication services. The changing of a telephone number can be quite costly to a business and is something both businesses and individuals will strive to avoid.

When a new service is first offered to the public, demand for the new service will generally be low, and the revenue that the new service will generate for the telephone companies is limited. On the other hand, there is a need for the telephone companies to spend large amounts of money to upgrade numerous central offices to make the new service widely available. If only a few central offices are upgraded, a new service may never be successful because it cannot be offered to a large enough body of potential customers. In addition, customers who do subscribe will be able to use the new service to communicate only with other customers who are also connected to an upgraded central office.

In view of the foregoing, it is an object of the present invention to provide a telecommunication network in which a subscriber location can change the node or central office to which it is connected without changing its telephone number, i.e., it is an object of the invention to provide a network with telephone number retention. More particularly, it is an object of the present invention to provide a telecommunication network which permits new services, such as ISDN, to be introduced to a large number of subscribers, but wherein only a limited number of nodes or central offices need to be upgraded to offer the new service. It is also an object of the invention to provide an architecture for a telecommunication network wherein subscribers not directly connected to an upgraded central office can access the upgraded central office and take advantage of new services without changing their telephone numbers.

One prior art network architecture which takes advantage of the large reductions in transmission costs by utilizing a relatively small number of well-placed switches is a ring network which makes use of the SONET (Synchronous Optical Network) signal transmission techniques. Another network which utilizes a small number of switches is a linear add/drop network which makes use of the SONET signal transmission techniques. Before discussing these networks, it will be helpful to briefly review the SONET signal transmission techniques. As used herein, the term SONET refers to a family of digital signals whose bit rates are integer multiples of a basic module signal. (See, e.g., R. Ballart and Yau-Chau Ching, "SONET: Now It's the Standard Optical Network," IEEE Comm. Magazine, March 1989, pp. 8-15; H. Sabit Say and R. Young, "SONET: Optical Highway of the 1990s and Beyond," Bellcore Exchange, July/August 1988, pp. 3-7;J. E. Jakubson, "Managing SONET Networks," IEEE LTS, November 1991, Vol. 2, No. 4, pp. 5-13; H. Shirakawa, K. Maki, and H. Miura, "Japan's Network Evolution Relies on SDH-Based Systems," IEEE LTS, November 1991, Vol. 2, No. 4, pp. 14-18; Michael To and James McEachern, "Planning and Deploying a SONET-based Metro Network," IEEE LTS, November 1991/Vol. 2, No. 4, pp. 19-23; T. R. Eames and G. T. Hawley, "The Synchronous Optical Network and Fiber in the Loop," IEEE LTS, November 1991, Vol. 2, No. 4, pp. 24-29; Izaz Haque, W. Kremer and K. Raychaudhuri, "Self-Healing Rings in a Synchronous Environment" IEEE LTS November 1991, Vol. 2 No. 4, pp. 30-37; P. Passeri, F. Balena, G. Bars, N. Vogt, and T. Wright, "Introducing SDH Systems in Europe," IEEE LTS, November 1991, Vol. 2, No. 4, pp. 38-43; Yau-Chau Ching and Grant W. Cyboron, "Where is SONET?" IEEE LTS, November 1991, Vol. 2, No. 4, pp. 44-51; C. N. Day and Chi-Ho Lin, "SONET and OSI: Making a Connection," IEEE LTS, November 1991, Vol. 2, No. 4, pp. 52-59.)

The basic module or first level of the SONET signal is called the Synchronous Transport Signal-Level 1 (STS-1). The STS-1 has a bit rate of 51.84 Mb/sec and is synchronous. The STS-1 signal is formed from a sequence of repeating frames. The STS-1 frame structure is illustrated in FIG. 2. The STS-1 frame structure can be drawn as 90 columns by 9 rows of 8-bit bytes. The order of transmission of the bytes is row by row, from left to right across the columns, with one entire frame being transmitted every 125 $\mu$s. The 125 $\mu$s frame period supports digital voice signal transport encoded using 1 byte/125 $\mu$s=64 kb/s. The first three columns of the STS-1 frame contain section and line overhead bytes. The remaining 87 columns form the STS-1 Synchronous Payload Envelope (SPE). The SPE carries SONET payloads including 9 bytes of path overhead. The STS-1 can carry a clear channel DS3 signal (44.736 Mb/s) or, alternatively, a plurality of lower-rate signals such as DS0, DS1, DS1C, and DS2 by dividing the Synchronous Payload Envelope into a plurality of fixed time slots. For example, 648 DS0 signals fit into the SPE of an STS-1 signal.

Higher rate SONET signals are obtained by byte interleaving N frame aligned STS-1 signals to form an STS-N signal in accordance with conventional SONET technology. An STS-N signal may be viewed as having a repetitive frame structure, wherein each frame comprises the overhead bits of N STS-1 frames and N synchronous payload envelopes. For example, three STS-1 signals may be multiplexed by a multiplexer into an STS-3 signal. The bit rate of the STS-3 signal is three times the bit rate of an STS-1 signal and the structure of each frame of the STS-3 signal comprises three synchronous payload envelopes and three fields of overhead bits from the three original STS-1 signals. When transmitted using optical fibers, the STS-N signal is converted to optical form and is designated as the OC-N signal.

FIG. 3 shows a ring network which utilizes the SONET signal transmission technique. The ring network 100 of FIG. 3 comprises a plurality of nodes 102, 103, 104, 105, 106, 107. Each node 102, 103, 104, 105, 106, 107 comprises an add/drop (A/D) multiplexer 112, 113, 114, 115, 116, 117. The central offices 122, 123, 124, 125, 126, 127 are connected to the A/D multiplexers 112, 113, 114, 115, 116, 117, respectively.

Illustratively, the central offices 122, 123, 124, 125, 126 are local central offices and a large number of subscriber locations are connected to these central offices. For example, a unit of customer premises equipment at the subscriber location 130 is connected to the central office 123 via the subscriber loop 131. Similarly, the units of customer premises equipment at the subscriber locations 132 and 133 are connected to the central office 124 via the subscriber loops 134 and 135. In addition, a unit of customer premises equipment at the subscriber location 138 is connected to the central office 126 via the subscriber loop 139. The central office 127 is a tandem central office for switching calls between the ring network 100 and the hierarchical network 150. The hierarchical network 150 comprises the central offices 127, 151, 152, 153, 154, 155. Illustratively, a unit of customer premises equipment at a subscriber location 160 is connected to the central office 151 via the subscriber loop 161.

The operation of the ring network 100 of FIG. 3 is as follows. A SONET signal comprising frames divided into time slots circulates around the ring 110. Typically, the SONET signal on the ring network 100 of FIG. 3 is a 3.2 Gigabit/sec STS-64 signal which contains 32,000 DS0 slots in each frame. In some cases the SONET ring network is bidirectional, in which case a SONET signal circulates in both directions around the ring 110.

The frames are received at an input of each A/D multiplexer (e.g. the input 129 of the A/D multiplexer 112) and regenerated at the output of each A/D multiplexer unit (e.g. the output 130 of the A/D multiplexer 112). Each A/D multiplexer can write data received from a subscriber location via central offices into particular time slots for transmission to a remote A/D multiplexer. For example, the central office 122 inputs data into the A/D multiplexer 112 via the input 128 and the A/D multiplexer 112 in turn writes this data into particular time slots in the SONET signal circulating around the ring. Each A/D multiplexer can also read data out of particular time slots originating from a remote A/D multiplexer and destined for an associated unit of customer premises equipment. In each SONET frame, particular time slots can be permanently dedicated to logical connections between particular pairs of nodes. For example, slot #1, slot #3 and slot #17 in each frame may be dedicated to logical connections between node 102 and node 104. Similarly, slot #2, slot #4 and slot #18 of each frame may be dedicated to logical connections between the node 103 and the node 107. The use of the dedicated time slots in the SONET ring network is utilized to achieve logical connections between pairs of nodes and between pairs of central offices. In contrast, in a hierarchical network, central office pairs are physically connected by trunks.

When the subscriber location 130 wishes to connect to the subscriber location 132, the call is routed via the subscriber loop 131 to the central office 123. The central office 123 looks at a prefix (i.e. area code and/or exchange number) contained in the called telephone number and determines that the call is to be routed to a specific node on the ring, in this case the node 104. The central office 123 maintains a table which indicates which slots in the SONET frame are dedicated to logical connections between the node 103 and the node 104. The A/D multiplexer 113 writes data to be transmitted from the node 103 to the node 104 into time slots in the SONET frames dedicated for a logical connection between this pair of nodes. This data is read out of the dedicated time slots by the A/D multiplexer 114 at the node 104 and transmitted to the central office 124. The data is then routed by the central office 124 via the subscriber loop 134 to the subscriber location 132. Through use of the dedicated time slots, the network may be viewed as forming a "logical trunk" between the node 103 and the node 104.

In another example, consider a call originating at the subscriber location 160 in the hierarchical network 150 and destined for the subscriber location 138 in the SONET ring network 100. The call is routed through the hierarchical network 150 and is received at the central office 127. The central office 127 looks at a prefix in the called telephone number to determine that it needs to utilize a time slot dedicated for transmitting from the node 107 to the node 106. The A/D multiplexer 117 writes data into the appropriate time slot in the SONET frame to establish the call connection to the node 106 and its central office 126.

Instead of utilizing a ring configuration, the A/D multiplexers may be arranged in a linear add/drop network and a SONET signal can be synchronously transmitted in both directions from one end of the linear network to the other.

While a conventional SONET ring or linear add/drop network may be utilized to reduce the number of central office switches, a conventional SONET network, such as the network 100 of FIG. 3, does not provide a practical way of implementing telephone number retention. In a SONET network calls are routed to destination nodes and destination central offices based on a prefix (i.e., area code or NNX) contained in a called telephone number. Therefore, the only way to provide telephone number retention in the conventional SONET ring network is to update simultaneously the routing tables of all of the central offices, an approach which is not practical. As a result, it is still necessary to upgrade all of the central offices to provide new services to all subscriber locations. If only some of the central offices are upgraded, subscribers who are not connected to an upgraded central office and who desire the new services will have to be reconnected to an upgraded office and, therefore, will have to change their telephone numbers.

In view of the foregoing, it is a further object of the present invention to provide an improved SONET network which has telephone number retention. In addition, it is an object of the invention to provide an improved SONET network in which new services can be made available to a subscriber who is not directly connected to an upgraded node or central office, without the subscriber having to change its telephone number. It is also an object of the present invention to provide an improved SONET network wherein new services can be offered to a large body of potential subscribers, while only upgrading a limited number of central offices.

SUMMARY OF THE INVENTION

In accordance with the present invention, a telecommunication network comprising a plurality of interconnected nodes, such as a SONET ring network, is modified through use of a unique controller. The controller maintains a mapping between the telephone numbers of subscriber locations and the network nodes to which the subscriber locations are connected. The controller permits a subscriber location to change the node to which it is connected without changing its telephone number, i.e., telephone number retention is achieved. Utilizing the ring controller, new services, such as a ISDN, can be offered to a large body of potential subscribers, while only a small number of central offices need actually be upgraded.

DETAILED DESCRIPTION OF THE INVENTION

Figure 1:
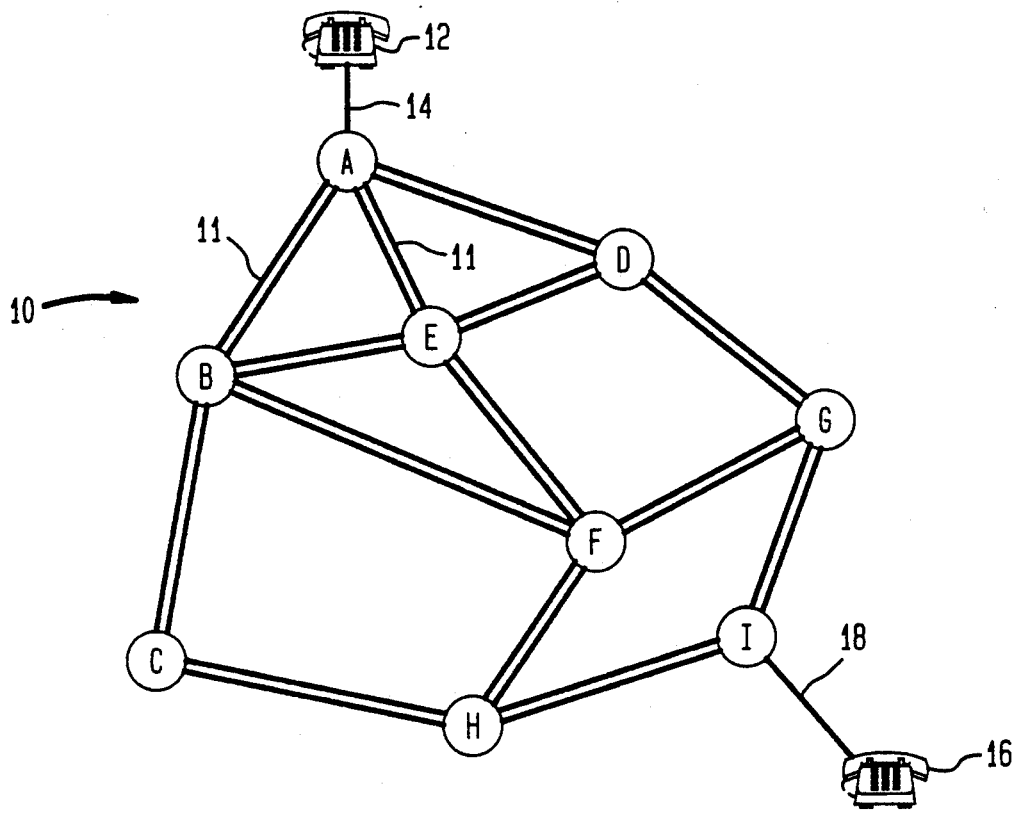
FIG. 1 schematically illustrates a conventional hierarchical public switched telephone network.
Figure 2:
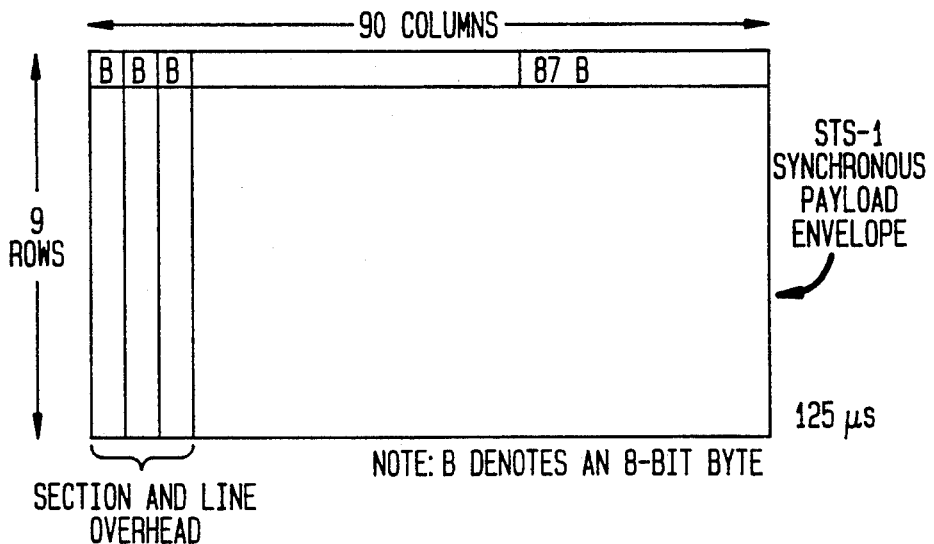
FIG. 2 illustrates the format of a SONET signal.
Figure 3:
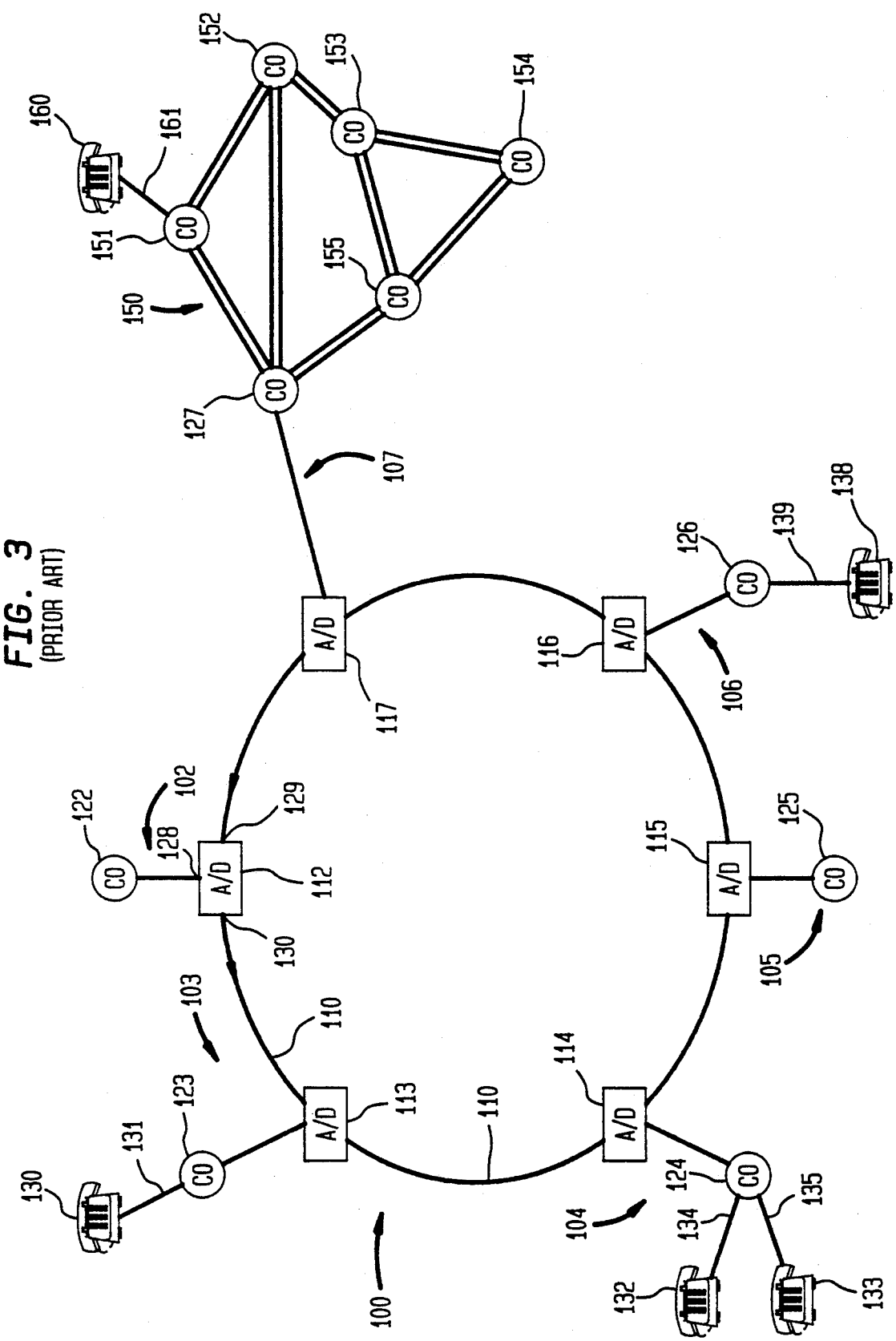
FIG. 3 illustrates a conventional SONET ring network.
Figure 4A:
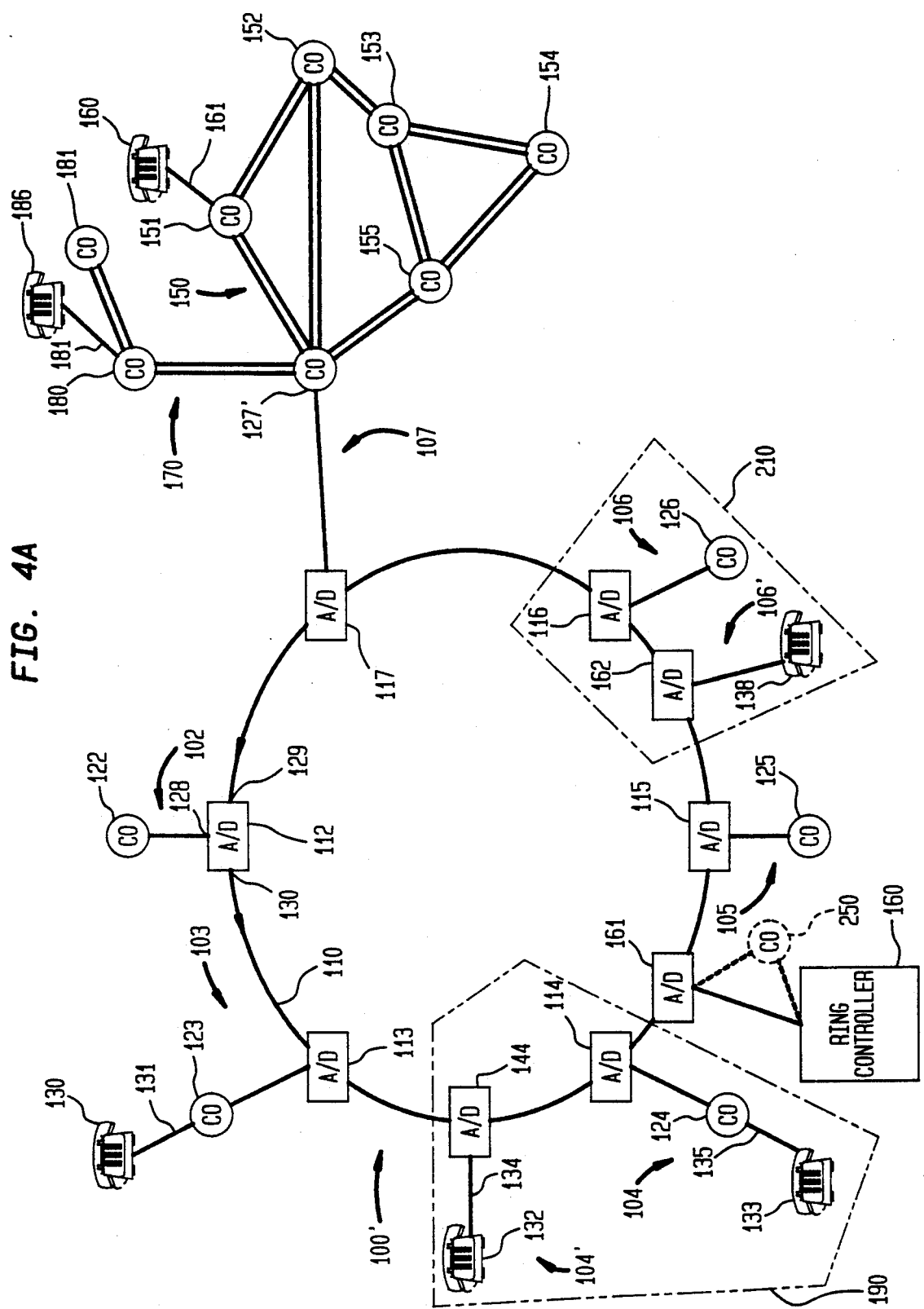
FIG. 4A illustrates an alternative SONET ring network in accordance with an illustrative embodiment of the present invention.
Figure 4B:
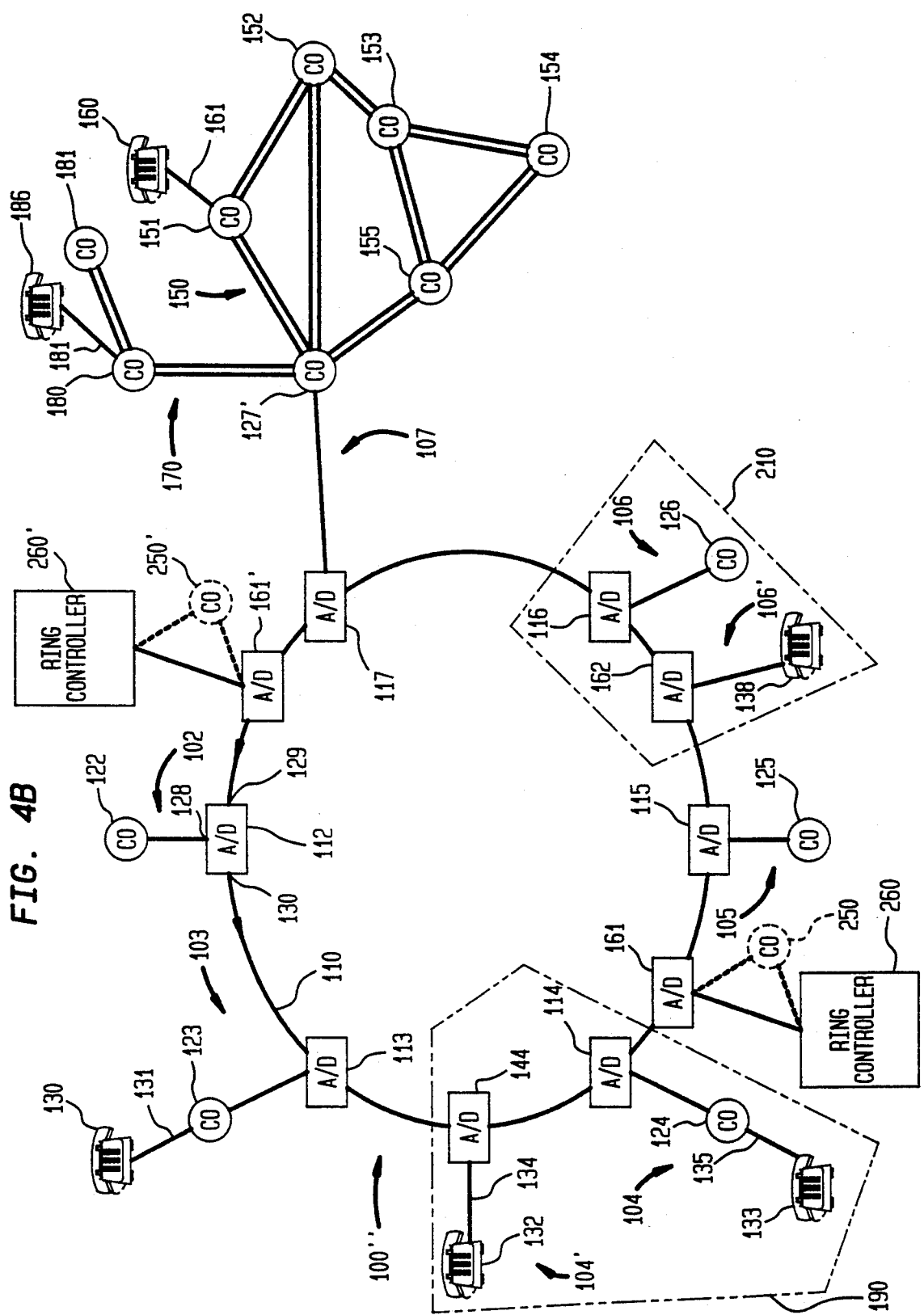
FIG. 4 illustrates a SONET ring network, in accordance with an illustrative embodiment of the present invention.

A network in accordance with the present invention is illustrated in FIG. 4. The network 100' of FIG. 4 is a SONET ring network which has been modified in accordance with the present invention. In particular, in FIG. 4, the node 107 has been upgraded so that the central office 127 of FIG. 3 has been replaced by the upgraded central office 127'. Illustratively, the upgraded central office 127' provides new telecommunication services such as ISDN or AIN. The upgraded central office 127' now serves to switch calls between the conventional hierarchical network 150 and the ring network 100' and serves to switch calls between the upgraded (e.g. ISDN) network 170 and the ring network 100'. The upgraded network 170 includes the upgraded central offices 180 and 181, as well as the central office 127'. The subscriber location 186 is connected to the central office 180 via the subscriber loop 181.

Also added to the ring network 100' is the ring controller 160, which may be implemented by any general purpose computer capable of performing high speed database operations. The ring controller 160 interfaces with the ring network 100' via the A/D multiplexer unit 161. The ring controller 160 is utilized to provide new telecommunication services to subscriber locations which are attached to the ring network 100' and not directly attached to an upgraded central office in the upgraded network 170, without such subscriber locations having to change their telephone numbers. The operation of the ring controller 160 is described in greater detail below.

As shown in FIG. 3, the subscriber location 132 was previously connected to the central office 124 of the node 104. In the ring network 100', the node 104' has been added to the network. The node 104' is constituted by the A/D multiplexer 144. In the network 100' of FIG. 4, the subscriber location 132 has been moved so that it is now connected to the node 104' by subscriber loop 134. Although the subscriber location 132 is now attached to the node 104', it still retains the same telephone number it had when it was attached to the central office 124 of the node 104, i.e., a telephone number with an area code or NNX normally associated with the node 104 and central office 124. The subscriber location 132 is now capable of utilizing new services through the upgraded central office 127'. It should be noted that the node 104 and the new node 104' may be located in the same physical location (e.g. building) designated as 190 in FIG. 4.

Similarly, in the ring network 100 of FIG. 3, the subscriber location 138 was attached to the central office 126 of the node 106. However, in order to enable this subscriber location to utilize new services without changing its telephone umber, the node 106' is added to the network. The node 106' is constituted by the A/D multiplexer 162 to which the subscriber location 138 with an unchanged telephone number is now connected by subscriber loop 139. Thus, although the subscriber location 138 is now attached to the node 106', it still has a telephone number normally associated with the node 106 and central office 126. Illustratively, the node 106 including the central office 126 and the node 106' are located in the same physical location designated as 210 in FIG. 4.

In the ring network 100' of FIG. 4 there are two sets of subscriber locations. The subscriber locations of a first set (e.g. 130, 133) are connected to their respective central offices within nodes and have telephone numbers with prefixes (i.e. an area code or NNX) that indicate the specific node and central office to which a subscriber location is attached. The subscriber locations of a second set (e.g., 132, 138) are connected to nodes but have telephone numbers whose prefixes are not indicative of the node or central office to which they are attached.

The routing of calls to the subscriber locations in the second set is enabled by the ring controller 160. To accomplish this routing, the ring controller 160 includes a data base management system for maintaining a mapping between the telephone numbers of the subscriber locations of the second set and the nodes to which these subscriber locations are attached.

Thus, when a subscriber location is moved from one node to another, the ring controller database is updated in a conventional manner. In addition, it is necessary to update the routing tables maintained in the old central office from which the subscriber location is removed and the new central office (e.g., the upgraded central office 127') with which the subscriber location is now associated. In addition, if a subscriber location is now attached directly to an A/D multiplexer (e.g., subscriber location 138 attached to A/D multiplexer 162), the database in the A/D multiplexer is updated so that a logical connection can be formed between the subscriber location and its new central office.

The ring controller 160 enables the subscriber locations 132, 138 to receive new telecommunication services via the upgraded central office 127' without being directly or physically connected to the central office 127' or to any other upgraded central office in the upgraded network 170 and without having to change telephone numbers.

A variety of different techniques may be utilized to route calls in the network 100' of FIG. 4. Consider a new service call originating at the subscriber location 186 in the network 170 and destined for the subscriber location 138 in the network 100'. This call is routed in the network 170 to the central office 127'. The call is then routed via the A/D multiplexer 117 to the network 100' and within the network 100' to the subscriber location 138 via A/D multiplexer 162. Illustratively, routing in the network 100' is carried out through the use of time slots which are permanently dedicated for connections between particular node pairs. The routing may take place in the network 100' as follows:

In a first routing scheme 1) the call is routed by the central office 127' via the A/D multiplexer 117 in the node 107 using the appropriate dedicated time slots to the node normally associated with the prefix (area code or NNX) contained in the called telephone number, i.e., the call is routed in the time slots normally dedicated for the transmission of data between nodes 107 and 106 to the node 106 and central office 126, 2) because the node 106 is now unable to complete the call, the node 106 queries the ring controller 160 using a control channel (i.e. control time slot in the SONET signal) and obtains the correct node for the telephone number of the call, i.e., node 106', from the database maintained in the ring controller 160, 3) the node 106 then reroutes the call to the node 106' in the appropriate dedicated time slots for data transmission between the nodes 106 and 106' to complete the call.

A drawback of this approach is that multiple switching is involved and there may be a long call setup delay.

In an alternative routing scheme, the ring controller 160 is connected to the ring network 100' by an optional local tandem central office 250 shown in phantom in FIG. 4. In this case, routing is accomplished as follows:

1) all calls from any originating central office, such as the central office 127' in the example given above in the ring network 100', are routed to the tandem central office 250, 2) the ring controller 160 is queried by the tandem central office 250 to determine the correct node to which the call should be routed, 3) the tandem central office 250 then routes the call to the correct node in an appropriate dedicated time slot.

The shortcoming of this routing approach is that the ring controller must maintain a larger database containing a mapping between all subscriber locations on the ring network 100' and the corresponding nodes and not just subscriber locations which have been moved. In addition, the tandem central office 250 may be a bottleneck.

In a third routing scheme, the originating node containing an upgraded central office may query the database in the ring controller 160 with the called telephone number using the SONET control channel to determine the correct destination node. The call is then routed by the originating node to the correct destination node on the ring as determined by the ring controller. Additionally, alternate routing schemes may use combinations of the first, second and/or third schemes described above.

Using one of the foregoing routing schemes, new service calls may be routed from a single upgraded central office (e.g. 127') to a large number of subscribers who are not directly connected to the upgraded central office 127' or to any upgraded central office and who do not have to change their telephone numbers. This enables migration to a new service network at a minimum initial cost.

FIG. 4A illustrates an alternative SONET ring network 100" in accordance with an illustrative embodiment of the present invention. The network 100" of FIG. 4A is the same as the network 100' of FIG. 4 except that the ring controller 160 is replaced by two ring controllers 260 and 260'. The ring controller 260 is connected to the network 100" via the optional local tandem central office 250 and the A/D multiplexer 161. The ring controller 260' is connected to the network 100" via the optional tandem local central office 250' and the A/D multiplexer 161'. Each ring controller 260, 260' maintains a database which maps subscriber location telephone numbers to nodes, at least for subscriber locations which have changed their node but not their telephone number. Each of the two ring controllers 260, 260' maintain the database for a particular set of telephone number prefixes. Thus, the database is now distributed rather than being located in a single location. This mitigates any bottlenecking problem at the ring controller and also mitigates the effects of ring controller failure on the network. Alternatively, ring controllers 260 and 260' may each contain the entire database which maps subscriber location telephone numbers which have changed nodes, thus avoiding contention for database inquiries and providing database redundancy. In some cases, it may be desirable to have a large number of ring controllers distributed around the SONET ring, with each individual ring controller maintaining the database for only one or a few local exchanges.

Figure 5:
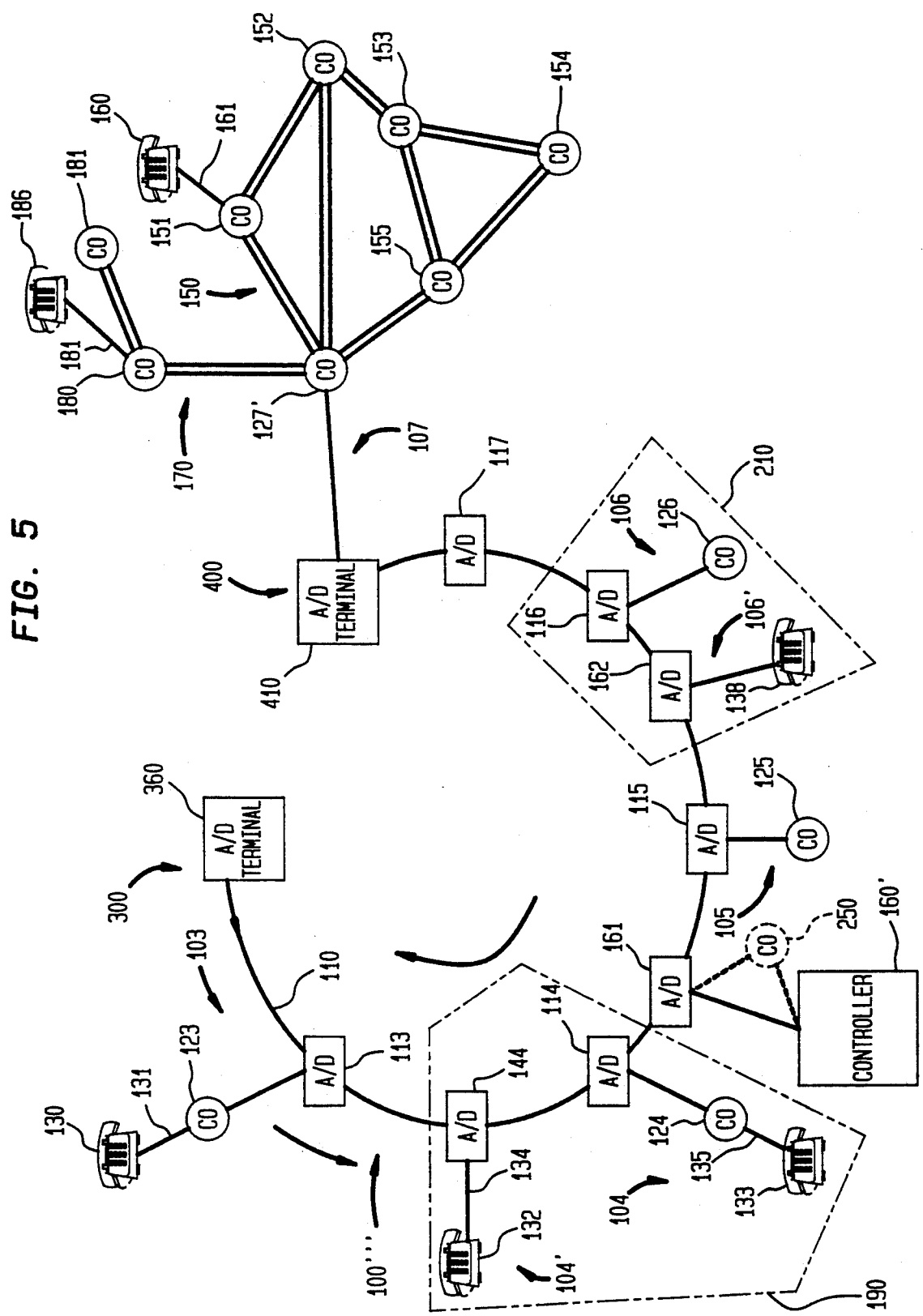
FIG. 5 illustrates a SONET linear network, in accordance with an illustrative embodiment of the present invention.

FIG. 5 illustrates another alternative network in accordance with the present invention. The network 100''' of FIG. 5 is similar to and operates in the same manner as the network 100' of FIG. 4 except that it has a linear and/drop configuration rather than a ring configuration. Thus, at the ends 300 and 400 of the linear network, the add/drop terminators 360 and 410 are utilized. SONET signals propagate from node to node in the linear network 100''' in both directions. The ring controller 160' of FIG. 5 is substantially identical to the ring controller 160 of FIG. 4. Specifically, the ring controller 160' is implemented by a general purpose processor capable of performing database operations and maintains a mapping between subscriber location telephone numbers and the nodes in the network to which the subscriber locations are attached.

Consider again a new service call originating at the subscriber location 186 in the network 170 and destined for the subscriber location 138 in the network 100'''. This call is routed in the network 170 to the central office 127'. The call is then routed via the A/D multiplexer 117 to the network 100''' and within the network 100''' to the correct subscriber location via a node determined by the controller 160'. Routing takes place via time slots permanently dedicated for connections between particular node pairs.

Both the A/D multiplexers and A/D terminators used in the networks 100', 100" and 100''' of the present invention are conventional components and are commercially available, for example, from Fujitsu and other manufacturers.

In short, in accordance with the present invention, a telecommunication network comprising a plurality of interconnected nodes, such as a SONET ring network, is modified through use of a unique controller. The controller maintains a mapping between the telephone numbers of subscriber locations and the nodes or central offices in the network to which the subscriber locations are attached. The controller permits a subscriber location to change the node to which it is attached without changing its telephone number, i.e., the controller permits telephone number potability to be easily achieved. Utilizing the controller, new services such as ISDN can be offered to a large body of potential subscribers, but only a small number of central offices need to be upgraded. Finally, the above-described embodiments of the invention are intended to be illustrative only. Numerous alternative embodiments may be devised by those skilled in the art without departing from the spirit and scope of the following claims.

I claim:

1. A communications network having both upgraded central offices allowing the offering of new services and central offices that have not been upgraded for such new services and wherein a subscriber desiring such new services can be connected to an upgraded central office while still utilizing a subscriber identifier associated with one of said other offices, said network comprising a synchronous optical (SONET) network, means individually connecting said upgraded and said other offices to said SONET network, and a ring controller distinct from said offices and independently connected to said SONET network and maintaining a mapping between subscriber identifiers and the central office to which a subscriber is actually connected for a subscriber connected to an upgraded office while still utilizing the subscriber identifiers associated with a central office that has not been upgraded.

2. A communication network in accordance with claim 1 wherein said means connecting said offices to said SONET network comprises SONET add/drop multiplexers.

3. A communications network in accordance with claim 2 wherein said SONET network is a closed ring configuration.

4. A communications network in accordance with claim 2 wherein said SONET network is a linear configuration and includes terminating means positioned at first and second ends of said linear configuration.

5. A communications network in accordance with claim 2 wherein signals comprising frames divided into time slots are transmitted both upstream and downstream in said SONET network.

6. A communication network comprising a synchronous optical (SONET) network.

a plurality of nodes each having one or more subscriber identifiers associated therewith and each of said nodes comprising a SONET add/drop multiplexer unit connecting said nodes to said SONET network.

means for connecting a plurality of subscriber locations to said nodes, each of said subscriber locations having a subscriber identifier normally associated with a particular one of said nodes, and a ring controller distinct from any of said nodes and a SONET add/drop multiplexer connecting said ring controller independently to said SONET network, said ring controller maintaining a mapping between said subscriber identifiers and the nodes to which the corresponding subscriber locations are connected, said controller permitting a subscriber location to be moved from one of said nodes to another of said nodes without changing its subscriber identifier.

7. The network of claim 6 wherein said SONET network is a closed ring configuration.

8. The network of claim 6 wherein said SONET network is a linear network configuration and wherein said SONET network includes first and second terminating nodes positioned at first and second ends of said linear configuration.

9. A communication network comprising a synchronous optical (SONET) network, a plurality of nodes and means connecting each of said nodes to said SONET network, means for connecting to said nodes a first set of subscriber locations, each subscriber location of the first set having an identifier associated with the particular one of said nodes with which it is connected, means for connecting to said SONET network a second set of subscriber locations, each said subscriber location of the second set having an identifier associated with a node to which a subscriber location of the first set is connected, and a controller distinct from said nodes and connected to said SONET network for controlling the routing of calls to subscriber locations of the second set.

* * * * *